United States Patent [19]

Tommaney

[11] Patent Number: 4,758,269
[45] Date of Patent: Jul. 19, 1988

[54] METHOD AND APPARATUS FOR INTRODUCING GAS INTO MOLTEN METAL BATHS

[75] Inventor: Joseph W. Tommaney, Sarver, Pa.

[73] Assignee: Allegheny Ludlum Corporation, Pittsburgh, Pa.

[21] Appl. No.: 18,150

[22] Filed: Feb. 24, 1987

[51] Int. Cl.⁴ .............................................. C21B 7/16
[52] U.S. Cl. .................................. 75/59.26; 266/265
[58] Field of Search ................ 75/59.26, 49; 266/265, 266/218, 223–224

[56] References Cited

U.S. PATENT DOCUMENTS

| | | | |
|---|---|---|---|
| 3,574,603 | 4/1971 | Rassenfoss | 75/49 |
| 3,645,520 | 2/1972 | Acre et al. | 266/34 |
| 4,413,815 | 11/1983 | Duhomez | 266/265 |
| 4,462,824 | 7/1984 | Nauman | 75/60 |

*Primary Examiner*—Peter D. Rosenberg
*Attorney, Agent, or Firm*—Patrick J. Viccaro

[57] ABSTRACT

A method and apparatus for introducing gas into a molten metal bath contained within a refractory-lined vessel by the distribution of gas bubbles in the metal bath. The distribution is disbursed and covers a wide areas and mixing within the bath is improved. This is accomplished with the use of a tuyere having a plurality of passageways which cause gas passing through the tuyere to exit into the bath as a series of gas jets which exit from the tuyere at an angle to its longitudinal axis. Preferably, the passageways in the tuyere are spiral so as to produce a swirling or vortical gas motion within the bath.

3 Claims, 1 Drawing Sheet

METHOD AND APPARATUS FOR INTRODUCING GAS INTO MOLTEN METAL BATHS

BACKGROUND OF THE INVENTION

While not limited thereto the present invention is particularly adapted for use in the production of metal alloys, such as steel, of various compositions. In the production of steel, for example, it is known to employ tuyeres to inject gas into the molten metal for the purpose of deoxidation, decarburization, desulfurization and stirring. Usually, the tuyeres extend through a refractory lining of a basic oxygen furnace, ladle or tundish; and in some cases a plurality of tuyeres are used in order to insure the proper amount of gas injection into the molten metal to carry out the desired process of decarburization, desulfurization, etc. In the case of a BOF vessel, for example, tuyeres are usually located adjacent the bottom portion of the vessel.

While it is heretofore been known to introduce a gas or mixture of gasses into a metal bath with the use of tuyeres or porous plugs, such prior art tuyeres introduce the gas into the metal bath in a straight line path rather than at an angular or circulatory path.

It is known in accordance with the prior art to introduce oxygen gas from a spiral type lance under the surface of a molten steel bath as described, for example, in U.S. Pat. No. 3,645,520. A consumable type lance of the type described in the aforesaid patent, however, is used primarily for the decarburization of molten metal and, as mentioned above, is blown under the surface of the molten metal bath rather than through the refractory side walls of a vessel.

A consumable type spiral lance for blowing oxygen under the surface of a molten steel bath is also expensive and must be replaced after every one or two heats. As will be seen, the tuyeres of the present invention are designed to last the life of the vessel, which is normally 400 or more heats before a rebuild is required.

While a spiral-type lance has been suggested in the past for blowing oxygen under the surface of a molten steel bath, problems associated with spiral injection below the level of the molten bath through tuyeres are entirely different. To begin with, when a gas is injected from a lance above a molten metal bath, there is no danger of refractory erosion in the area immediately surrounding the lance also, the lance is consumed as it erodes in the molten metal bath and must be fed downwardly to keep the gas flow under the surface of the bath. When gas is injected from a tuyere, however, care must be taken such that a strong metal flow is not set up against the surrounding refractory. Such a flow contributes to a premature failure of the refractory. Furthermore, tuyere pressures must be closely regulated in order to avoid a buildup at the end of the tuyere known to those skilled in the art as "mushrooms" or "knurdles". Similarly, a burn back at the face of the tuyere could result in premature failure of the tuyere and/or vessel. These considerations are the subject of a mathematical model for a straight pipe tuyere described in U.S. Pat. No. 4,462,824.

SUMMARY OF THE PRESENT INVENTION

One object of the present invention is to provide a method and apparatus for increasing the gas flow and gas distribution to molten metal vessels, such as ladles in order to improve refining reactions and increase stirring without a detrimental increase in splash or overflow from such ladles.

Another object of the invention is to provide a method of stirring molten metal in an electric furnace or basic oxygen furnace to permit improved composition control and refining without directing a metal jet up to the electrodes or oxygen lance.

A further object of the invention is to allow for a longer residence time for gas bubbles in metal baths and to provide for better stirring.

Another object of the invention is to allow a lower gas flow rate from the tuyere at any given operating temperature. This feature is important for oxygen refining vessels since it conserves expensive processed gasses such as argon or nitrogen during the early part of the blow when sufficient stirring is obtained from the carbon monoxide boil.

A still further object of the invention is to insure that the angular path of injected gasses into a molten metal bath will not be altered by burnback or erosion of a tuyere introducing the gas into the bath.

Finally, it is an object of the invention to control the distribution of gas bubbles in a metal bath by a pulse type control of the amplitude and frequency of the pressure and flow from the tuyeres.

The above and other objects and features of the invention become apparent from the following detailed description taken in connection with the accompanying drawings which form a part of this specification and in which:

DESCRIPTION OF THE PREFERRED EMBODIMENTS

Figure 1:
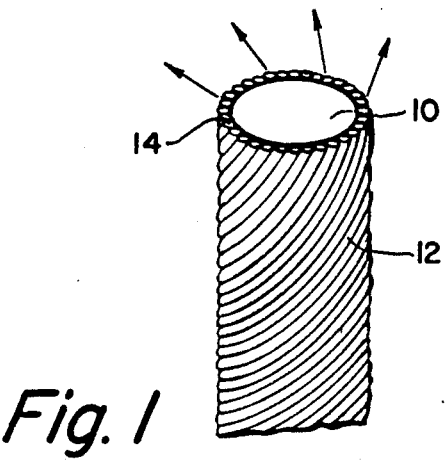
FIG. 1 is an illustration of one type of tuyere for injecting gas into a vessel at an angular or spiral path.

With reference now to the drawings, and particularly to FIG. 1, one type of a tuyere constructed in accordance with the teachings of the invention is shown and comprises a refractory center or core 10 having a plurality of spiral tubes 12 wound around its circumference and terminating at openings 14 at the upper end of the tuyere. The flow of gas exiting from the openings 14 will be at an angle with respect to the longitudinal axis of the tuyere and will produce swirling or generally helical pattern.

Figure 2:
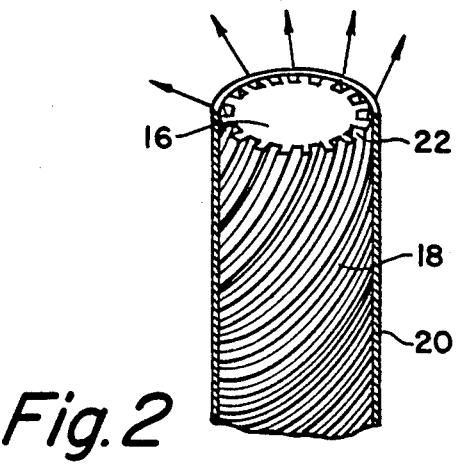
FIG. 2 is an illustration of another embodiment of the tuyere of the invention.

In FIG. 2, another embodiment of the invention is shown which again includes a refractory center or core 16. In this case, the core 16 has spiral grooves 18 formed on its outer periphery a manner similar to threads on a machine screw. The spiral grooves, in turn, are covered by a metal tube and by an outer refractory sheath 20 such that gas exiting from the upper open ends of the grooves 18 will again be at an angle with respect to the longitudinal axis of the tuyere to produce a spiral or generally helical pattern.

Figure 3:
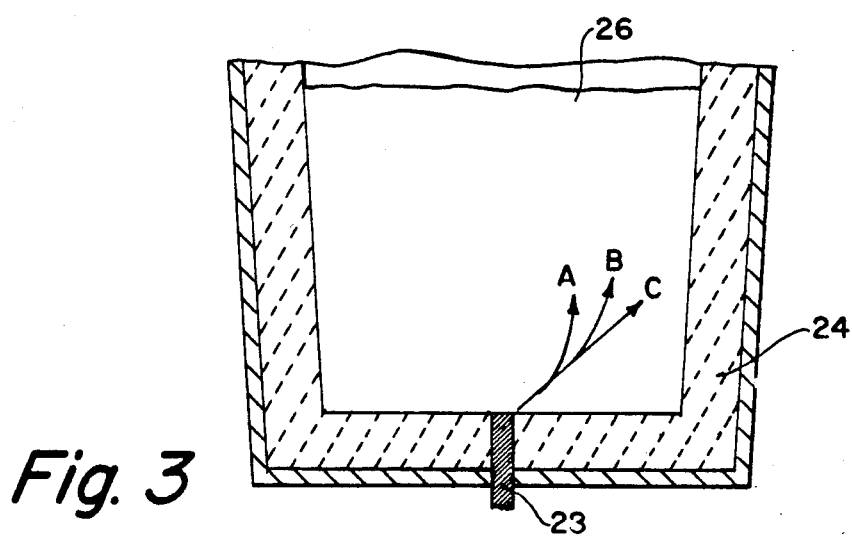
FIG. 3 illustrates the manner in which, by the use of pressure pulse control, a gas flow from the tuyere can be made to follow different paths, depending upon requirements.

FIG. 3 illustrates a typical application of the invention as applied to a ladle for molten steel baths. The ladle itself is identified by the reference numeral 24 and the molten bath by the reference numeral 26. The spiral tuyere 28 of the invention extends upwardly through the bottom of the ladle as shown. The path of the gas bubbles in the metal bath after leaving the tuyere 28 is a function of the angle of the grooves in the tuyere relative to the metal bath and the conduit dimensions, flow rate, pressure and type of processed gas. By varying the pressure as a function of time, the gas bubbles can be directed to cover a wide area of the bath. This is illustrated, for example, in FIG. 3 by the flow paths A, B and C. The frequency and amplitude of this type of pressure pulse can be determined empirically, depending upon requirements. Preferably, tuyere 28 is located in a lower wall portion of the vessel below the level of molten metal; more particularly, in a bottom wall of the vessel.

Figure 4:
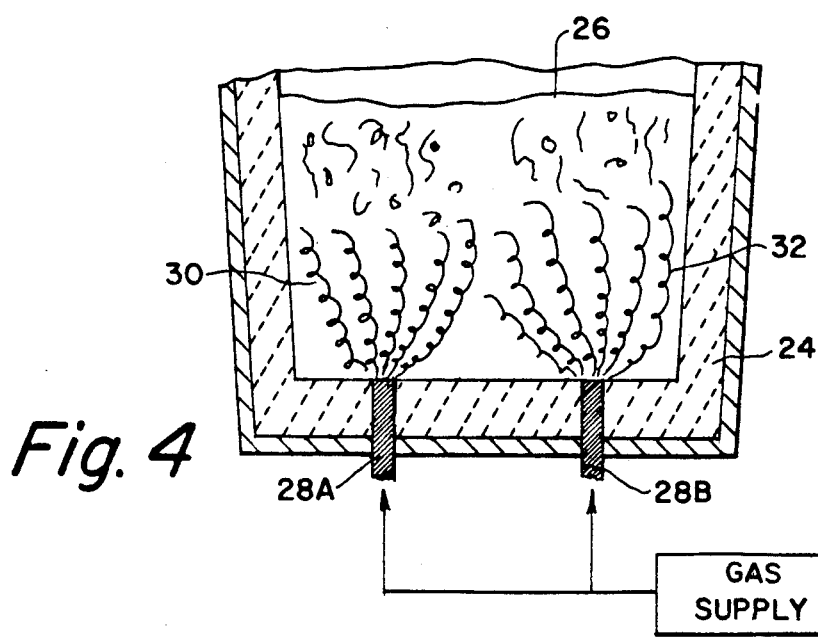
FIG. 4 illustrates the gas distribution within a typical ladle employing multiple tuyeres of the invention.

The particular method or use of the invention is dependent on its application to specific steel making vessels. In ladle applications, for example, the tuyere must be designed to provide a relatively low flow of processed gas. Conventional tuyeres and porous plugs supply processed gas to ladles on the order of a few cubic feet per minute. When higher rates are used, problems with splashing and nitrogen pickup are encountered due to the fact that the gas is injected along a straight line directly into the metal bath. With the present invention, flow rate can be increased since the gas bubbles in the bath are dispersed over large areas as shown in FIG. 4 where two tuyeres 28A and 28B are used to produce dispersed gas and bubble formations 30 and 32. This will result in improved disposition of the bubbles to improve mixing in the ladle, resulting in cleaner steel by improving the kinetics of the filtering action of the bubbles and removing inclusions. Increased flow will also reduce the hydrogen and nitrogen content of the steel. This later function is dependent on the maximum volume of inert gas which can be tolerated without producing excessive splash. A gain in productivity will also result from increased flow rate. If desired, however, one only tuyere can be used without departing from the present invention.

In the case of electric furnaces, poor mixing is one of the major problems. Operators have been reluctant to use porous plugs or tuyeres to obtain better mixing for fear of directing jets of metal up to the electrodes or the arc zones. Use of the spiral tuyere of the present invention will resolve this difficulty. Several advantages are obtained in electric furnace applications if the bath can be stirred. Melt-down time should be shortened, resulting in increased productivity and decreased power costs if the bath temperature can be homogenized. Better mixing will also result in better chemistry control, thus reducing the adjustment additions required in the AOD. Mixing in the electric furnace can be done with less expensive nitrogen gas rather than argon when the heat is to be subsequently AOD refined since the heats are normally saturated with nitrogen in the AOD. Flow rates for the electric furnace application can be reasonably low, and the order of 30 to 50 cubic feet per minute.

There are also advantages to using the spiral tuyere of the invention on combined blowing vessels such as the BOF. These advantages include directing the metal flow away from the oxygen lance. The tuyere design of the invention should also allow a more favorable relationship between flow rate and operating temperature. This feature will conserve expensive process gas since a higher gas flow will not be needed to cool the tuyeres. Various steel alloys, such as stainless and silicon steels would benefit.

Although the invention has been shown in and with certain specific embodiments, it will be readily apparent to those skilled in the art that various changes in form and arrangement of parts may be made to suit requirements without departing from the spirit and scope of the invention.

I claim as my invention:

1. A method for introducing gas into a molten metal bath contained within a refractory-lined vessel, which comprises providing in the bottom of the refractory-lined vessel below the level of molten metal therein a gas tuyere, and injecting into the molten metal bath through the tuyere a series of gas jets which exit from the tuyere at an angle to its longitudinal axis in a generally helical pattern for producing a circulatory distribution of gas bubbles in the metal bath for dispersing in a generally horizontal direction within the vessel and mixing within the bath, said angle being sufficient to produce the circulatory flow of gas without setting up an eroding metal flow about the refractory wall adjacent the tuyere and without molten metal splashing.

2. The method of claim 1 including the step of varying the pressure and flow rate of gas passing through said tuyere.

3. The method of claim 1 wherein gas is injected into the molten metal bath through a plurality of tuyeres by a series of gas jets which exit from the tuyere axes at angles to the longitudinal axis of the tuyere.

* * * * *